US009942223B2

(12) United States Patent
Vincent et al.

(10) Patent No.: US 9,942,223 B2
(45) Date of Patent: Apr. 10, 2018

(54) AUTOMATED DEVICE DISCOVERY OF PAIRING-ELIGIBLE DEVICES FOR AUTHENTICATION

(71) Applicant: Microsoft Technology Licensing, LLC., Redmond, WA (US)

(72) Inventors: Benjamin Richard Vincent, Kirkland, WA (US); Venkatesh Gopalakrishnan, Bellevue, WA (US); Jay Fluegel, Kirkland, WA (US)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 125 days.

(21) Appl. No.: 14/952,180

(22) Filed: Nov. 25, 2015

(65) Prior Publication Data

US 2017/0149771 A1     May 25, 2017

(51) Int. Cl.
*G06F 3/00* (2006.01)
*H04L 29/06* (2006.01)
(Continued)

(52) U.S. Cl.
CPC ..... *H04L 63/0853* (2013.01); *G06Q 10/1095* (2013.01); *H04W 8/005* (2013.01);
(Continued)

(58) Field of Classification Search
CPC ... G06Q 10/1095; H04W 12/06; H04W 8/005
See application file for complete search history.

(56) References Cited

U.S. PATENT DOCUMENTS 6,678,265 B1 * 1/2004 Kung .................. H04L 12/66
                                                     370/352
7,324,462 B1 * 1/2008 Page .................. H04W 8/005
                                                     370/255
(Continued)

OTHER PUBLICATIONS

"International Search Report and Written Opinion Issued in PCT Application No. PCT/US2016/062641", dated Jan. 30, 2017, 12 Pages.
(Continued)

*Primary Examiner* — Sayed Beheshti Shirazi
(74) *Attorney, Agent, or Firm* — Merchant & Gould

(57) ABSTRACT

Automated device discovery of pairing-eligible devices for authenticating an unidentified user of a computing device is provided. When the user initiates a login on the computing device on which the user's identity is not known, an automated pairing-eligible device discovery authentication system interrogates a resource (e.g., subnetwork router, calendaring server) for identifying pairing-eligible devices that may be used as a second factor for authentication. A list of the pairing-eligible devices is presented to the user on the computing device. Upon selection of a pairing-eligible device to use as a second factor to verify the user's identity, the user's identity is determined, and a notification is sent to the selected pairing-eligible device for enabling the user to verify his/her identity using a second factor. Upon completion of an authentication challenge on the selected pairing-eligible device, authentication of the user is completed, and a signed token is sent to the computing device.

14 Claims, 12 Drawing Sheets

(51) Int. Cl.
*G06Q 10/10* (2012.01)
*H04W 8/00* (2009.01)
*H04W 12/06* (2009.01)
*H04W 76/02* (2009.01)
*H04W 48/16* (2009.01)

(52) U.S. Cl.
CPC .......... *H04W 12/06* (2013.01); *H04W 48/16* (2013.01); *H04W 76/023* (2013.01)

(56) References Cited

U.S. PATENT DOCUMENTS

| | | | | |
|---|---|---|---|---|
| 7,603,556 | B2* | 10/2009 | Brown | H04L 9/3271 713/169 |
| 7,979,899 | B2* | 7/2011 | Guo | H04L 63/0823 726/20 |
| 8,346,265 | B2* | 1/2013 | Strub | H04L 63/08 370/259 |
| 8,401,244 | B2* | 3/2013 | Vogler | G06F 21/32 340/5.84 |
| 8,495,720 | B2* | 7/2013 | Counterman | H04L 9/3226 455/433 |
| 8,769,612 | B2* | 7/2014 | Ganapathy | H04W 12/06 380/247 |
| 2008/0011827 | A1* | 1/2008 | Little | H04W 12/06 235/380 |
| 2011/0063103 | A1* | 3/2011 | Lee | H04M 1/6066 340/505 |
| 2012/0047289 | A1* | 2/2012 | Krzystofczyk | H04L 63/083 710/10 |
| 2013/0104198 | A1* | 4/2013 | Grim | H04L 63/08 726/4 |
| 2013/0185654 | A1* | 7/2013 | Harris | H04W 4/206 715/753 |
| 2013/0191902 | A1* | 7/2013 | Friedl | H04L 9/3271 726/7 |
| 2013/0291071 | A1* | 10/2013 | Blom | H04L 9/0833 726/4 |
| 2014/0195595 | A1* | 7/2014 | Schwebke | H04L 67/42 709/203 |
| 2015/0019994 | A1* | 1/2015 | Freudenthaler | G06F 9/4445 715/748 |
| 2015/0089222 | A1* | 3/2015 | White | H04L 63/0428 713/168 |
| 2015/0281227 | A1* | 10/2015 | Fox Ivey | H04L 63/0853 713/168 |
| 2016/0155281 | A1* | 6/2016 | O'Toole | G07C 9/00182 340/5.64 |
| 2016/0286393 | A1* | 9/2016 | Rasheed | H04L 9/3215 |
| 2016/0296142 | A1* | 10/2016 | Culbert | A61B 5/1171 |

OTHER PUBLICATIONS

Chen, et al., "Secondary User Authentication Based on Mobile Devices Location", In Proceedings of IEEE Fifth International Conference on Networking, Architecture and Storage, Jul. 15, 2010, pp. 277-281.
"Managing Your Devices", Published on: Jun. 15, 2014 Available at: https://guide.duosecurity.com/manage-devices.
Jansen, Wayne., "Authenticating Mobile Device Users through Image Selection", In Proceedings of the First International Conference on the Internet Society, May 2004, 10 pages.
International Preliminary Report on Patentability Issued in PCT Application No. PCT/US2016/062641, dated Aug. 3, 2017, 7 Pages.

* cited by examiner

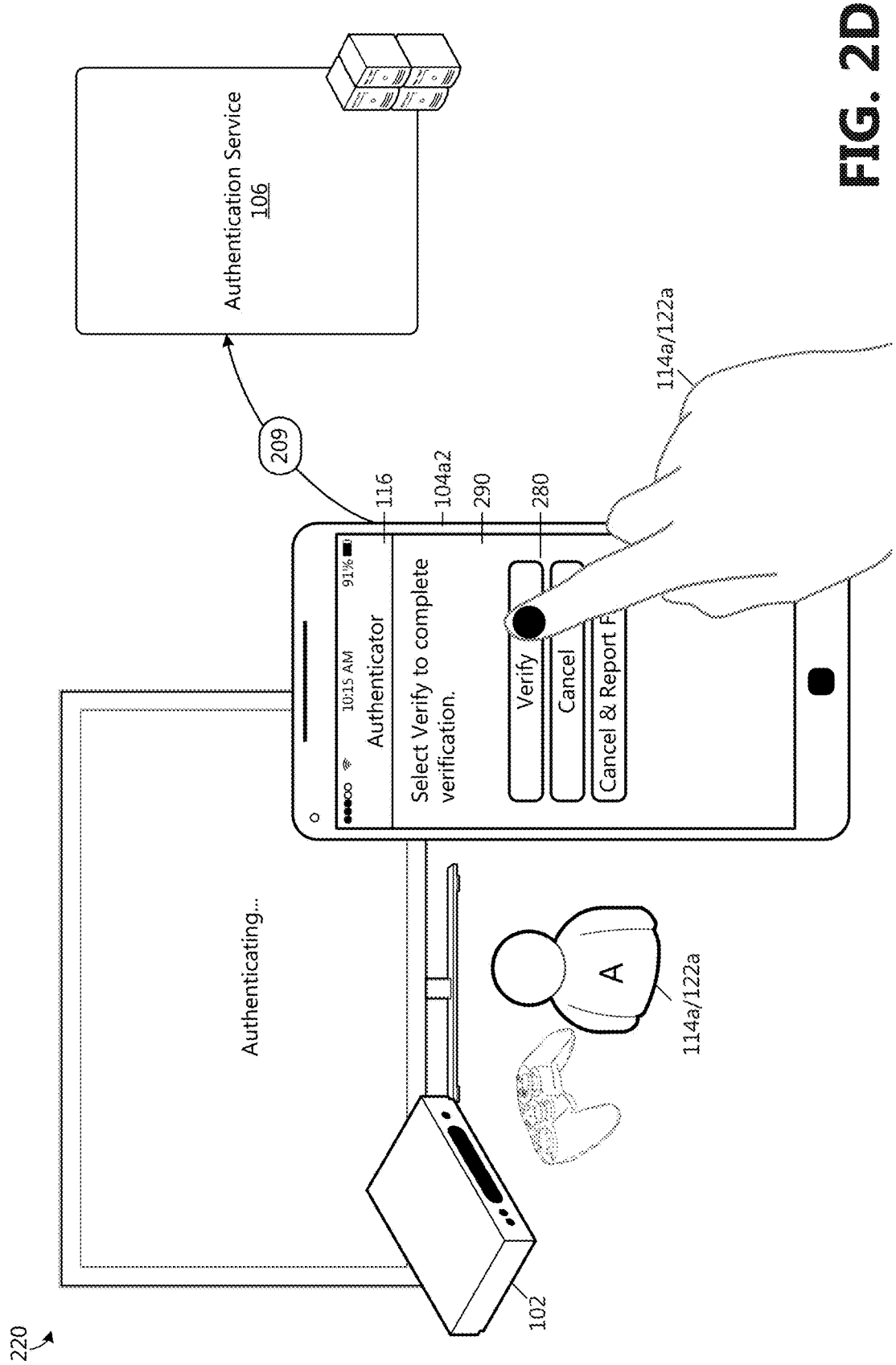

MOBILE COMPUTING DEVICE

AUTOMATED DEVICE DISCOVERY OF PAIRING-ELIGIBLE DEVICES FOR AUTHENTICATION

BACKGROUND

Various systems and networks require authenticating a user's identity for allowing the user access to systems, applications, and resources. For example, when a user logs onto a computing device or attempts to log into a network, the user may be prompted to provide information or identification, which is compared to information stored in a database of authorized users' information on the device or at an authentication server. If the information matches, the user is authenticated and granted authorization for access.

The information that the user provides can include one or more pieces of information that can be of one or multiple factor types. For example authentication factor types may include a knowledge factor (e.g., password, personal identification number (PIN), secret question), a possession factor (e.g., based on an item that a user has in his/her possession, such as a security token or device used in conjunction with a software token), an inherence factor (e.g., user's voice, hand configuration, heart rhythm, fingerprint, retina scan), a location factor, or a time factor.

To increase security, a system may require two-factor authentication, which requires the presentation of two authentication factors, three-factor authentication, which requires the presentation of each of the three authentication types, four-factor authentication, or five-factor authentication.

As can be appreciated, entry of a knowledge factor, such as a password can be cumbersome, particularly on certain types of devices. For example, on a gaming device where a user interacts with the device using a game controller, or on a wearable device, such as watch, where a keyboard nor a soft keyboard are provided, entry of a password can be complicated. Additionally, passwords are increasingly easy to compromise (e.g., stolen, guessed, shared, hacked), and can be challenging to remember.

Accordingly, many systems are increasingly using possession factor authentication, where a secondary device that is linked to a user is utilized for authenticating the user on a first device. To authenticate a user on a device using a secondary device, the two devices need to be associated with each other. Typically, associating a device with the secondary device is accomplished by manually pairing the two devices or manually pairing the device with an account associated with the secondary device. For example, one device may display a matrix barcode (e.g., QR code). On the other device, the user may capture an image of the matrix barcode, which would then link the two devices so authentication can be completed.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for automated device discovery of pairing-eligible devices for authenticating an unidentified user of a computing device. According to examples, when a user initiates a login on a computing device on which the user's identity is not known, an automated pairing-eligible device discovery authentication system automatically discovers pairing-eligible devices associated with a network resource, and generates a list of the pairing-eligible devices, which is presented to a user on the computing device. The user in enabled to select a pairing-eligible device from the list as a secondary device on which to perform authentication and verify the user's identity. For example, the user is enabled to select a pairing-eligible device that is associated with him/her, thus identifying the user. A notification is sent to the selected pairing device for authenticating via a secondary device. Upon completion of an authentication challenge on the selected pairing device, authentication of the user is completed, and a signed token is sent to the computing device.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 2A-2E are data flow diagrams illustrating a flow of data through an example automated pairing-eligible device discovery authentication system;

DETAILED DESCRIPTION

Figure 1:
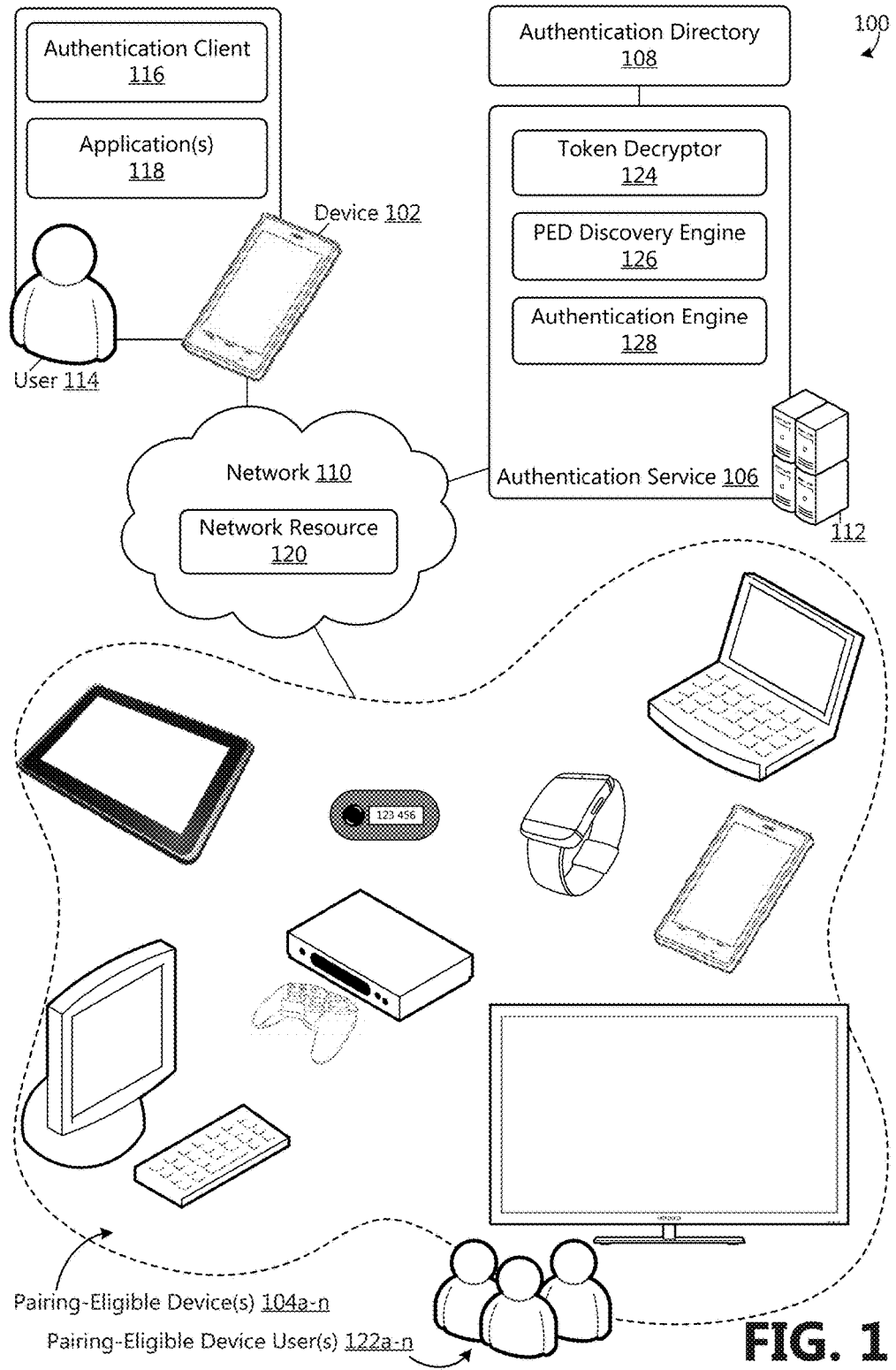
FIG. 1 is a simplified block diagram showing components of an example system for automated device discovery of pairing-eligible devices for authenticating a user via a secondary device.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and device for automated device discovery of pairing-eligible devices for authenticating a user via a secondary device. When the user initiates a login on a computing device on which the user's identity is not known, an authentication client executing on the computing device interrogates a resource (e.g., subnetwork router, calendaring server) for identifying pairing-eligible devices that may be used as a secondary device for authenticating the user (i.e., possession factor authentication). A list of the pairing-eligible devices is presented to the user on the computing device from which the user is enabled to select a pairing-eligible device with which he/she is associated to use a the secondary device. Upon selection of a pairing-eligible device, the user's identity is inferred, and a notification is sent to the selected pairing-eligible device for enabling the user to verify his/her identity using the secondary device. Upon completion of an authentication challenge on the selected pairing-eligible device, authentication of the user is completed, and a signed token is sent to the computing device.

According to examples, automatically interrogating a resource for discovering pairing-eligible devices that may be used as a secondary device on which a user can verify his/her identity for authentication improves user efficiency. For example, the user is not required to manually pair a secondary device with a computing device to link the devices so that authentication can be performed via the secondary device. According to other examples, inferring the user's identity from a selection of a pairing-eligible device improves user interaction performance by eliminating a need for the user to manually enter an user identifier (e.g., a username) or a knowledge factor (e.g., a password, PIN). For example, particularly on devices with limited display space or devices where a keyboard nor a soft keyboard are provided, entry of a username or password can be cumbersome. Additionally, with knowledge factors (e.g., passwords) being increasingly easy to compromise, incorporating a possession factor for authentication provides a second layer of security.

With reference now to FIG. 1, a simplified block diagram of one example of an automated pairing-eligible device discovery authentication system 100 is shown. As illustrated, the automated pairing-eligible device discovery authentication system 100 includes a computing device 102. The computing device 102 illustrated in FIG. 1 is illustrated as a mobile computing device (e.g., a mobile communication device); however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 118 for performing a variety tasks.

For example, a user 114 may utilize an application 118 on the computing device 102 for a variety of coordinated functions, tasks, or activities, which may include, for example, to write, calculate, draw, organize, prepare presentations, send and receive electronic messages, take and organize notes, make music, and the like. Applications 118 may include thick client applications, which may be stored locally on the computing device 102, or may include thin client applications (i.e., web applications) that may reside on a remote server and accessible over a network 110, such as the Internet or an intranet. A thin client application may be hosted in a browser-controlled environment or coded in a browser-supported language and reliant on a common web browser to render the application 118 executable on the computing device 102. According to some examples, a user 114 may be required to authenticate his or her identity to access the application 118, as well as other resources.

According to examples, an authentication client 116 is illustrative of a software module, system, or device operative to execute various client-side authentication steps for authenticating an unidentified user 114 of a computing device 102. For example, the authentication client 116 is operative to perform various steps for discovering pairing-eligible devices 104a-n (collectively, 104) that may be used as a potential secondary device for possession factor authentication. According to an aspect, the authentication client 116 is operative to interrogate a network resource 120 for discovering one or more pairing-eligible devices 104. A pairing-eligible device 104 is embodied a computing device (e.g., a tablet computing device, a desktop computer, a mobile communication device, a laptop computer, a laptop/tablet hybrid computing device, a large screen multi-touch display, a gaming device, a smart television, a wearable device, a hardware token, or other type of computing device), operative to verify a user's 114 identity.

In some examples, the network resource 120 is a router associated with a subnetwork, such as a wireless local area network (WLAN), a personal area network (PAN), campus area network (CAN), metropolitan area network (MAN), and the like. The authentication client 116 is operative to send a request message to devices connected to the subnetwork, for example, by sending a broadcast packet to the router, wherein each device connected to the subnetwork receives the request message. According to an aspect, the request message asks the receiving device if it is able to verify an identity of a user 114, which elicits a response from the device if the device is a pairing-eligible device 104. For example, in response to the request message, a pairing-eligible device 104 returns an encrypted token including a unique identifier identifying the pairing-eligible device 104. In some examples, the encrypted token includes a unique user identifier identifying the user (pairing-eligible device user 122a-n, collectively 122) of the pairing-eligible device 104. For example, the encrypted token may include an email address, alias, or a username of the pairing-eligible device user 122.

In some examples, the network resource 120 is a server, such as a calendaring server, wherein the authentication client 116 is operative to query the server via an application programming interface (API) call for a list of attendees associated with a specified calendaring event (e.g., meeting). In response, the server responds with an encrypted list of user account identities (e.g., email addresses, usernames, aliases) associated with attendees of the specified calendaring event.

The authentication client 116 is further operative to generate and send a pairing device discovery request comprising the received responses to an authentication service 106 running on an authentication server 112, to receive a response from the authentication service 106 of pairing-eligible devices 104, and display the list of pairing-eligible devices 104 from which the user 114 is enabled to select as a secondary device on which the user 114 can verify his or her identity.

The authentication service 106 is illustrative of a software module, system, or device operative to authenticate credentials associated with a user 114 for allowing the user access to systems, applications, and resources. According to examples, the authentication service 106 comprises a token decryptor 124 illustrative of a software module, system, or device operative to decrypt the tokens provided by one or more pairing-eligible devices 104 to retrieve identities of the pairing-eligible device users 122. According to some examples, the token decryptor 124 is operative to decrypt and identify user identities associated with attendees of the specified meeting or event provided by the calendaring server.

According to examples, the authentication service 106 comprises a pairing-eligible device discovery engine 126 illustrative of a software module, system, or device operative to interrogate an authentication directory 108 for the pairing-eligible devices 104 associated with each identified pairing-eligible device user 122 or meeting attendee. According to an aspect, the authentication directory 108 comprises mappings between users and associated devices, including pairing-eligible devices 104. The authentication directory 108 includes additional information about associated devices, for example, a type of device (e.g., phone, tablet, gaming device, wearable device, alarm system, light switch).

In some examples, the pairing-eligible device discovery engine 126 is further operative to make a determination as to whether a number of pairing-eligible devices 104 identified in the pairing device discovery request is above a predetermined threshold value. For example, a threshold value may be predetermined as a maximum number of pairing-eligible devices 104 that the authentication service 106 will provide to an authentication client 116 for enabling a user 114 to select from as a desired factor on which the user 114 can verify his or her identity.

In some examples, the pairing-eligible device discovery engine 126 is operative to interrogate the authentication directory 108 for specific types of pairing-eligible devices 104 associated with a pairing-eligible device user 122. For example, the pairing-eligible device discovery engine 126 may query the authentication directory 108 for device types that a user is likely to use as a factor on which to verify his or her identity. For example, various types of devices may be associated with a particular user 114,122, such as a mobile phone, an alarm system, and a gaming system. From the above types of devices associated with the particular user 114,122, the mobile phone is a device type the user would most likely have with him or her and that would provide a user-friendly interface for verifying his or her identity, while the alarm system is a device type that would not be a preferable device for providing a user interface for allowing the user to verify his or her identity. Accordingly, the pairing-eligible device discovery engine 126 may first interrogate the authentication directory 108 for mobile-type computing devices; and if there is not a mobile-type device associated with a user, then the pairing-eligible device discovery engine 126 queries the authentication directory 108 for a next type of device.

In other examples, the pairing-eligible device discovery engine 126 is operative to analyze the list of pairing-eligible devices 104 associated with the identified pairing-eligible device users 122, and remove selected types of pairing-eligible devices 104 from the list. For example, the pairing-eligible device discovery engine 126 is operative to analyze the list, and determine which devices would not provide an efficient user interface for enabling a user 114 to verify his or her identity.

In other examples, a particular device may be selected as a preferred or default pairing device. Accordingly, the pairing-eligible device discovery engine 126 is operative to query the authentication directory 108 for the pairing-eligible device 104 selected as the preferred or default device for each user.

The pairing-eligible device discovery engine 126 is further operative to generate and send a list identifying pairing-eligible devices 104 to the authentication client 116 executing on the computing device 102 for displaying to the user 114 via a user interface. The pairing-eligible devices 104 may be identified by a unique identifier, such as a name, alias, or graphical representation of each device (pairing-eligible device 104) or user of each device (pairing-eligible device user 122). For example, the user 114 may select a pairing-eligible device 104 from the list that is associated with the user 114. That is, the user 114 may select a pairing-eligible device 104 that he/she is the pairing-eligible device user 122 of and from which the user will be enabled to verify his/her identity.

Upon selection of a pairing-eligible device 104 by the user 114, the authentication client 116 is operative to generate a response message specifying the selection of the pairing-eligible device 104 made by the user, and send the response message to the authentication service 106. According to an aspect, the identity of the user 114 of the computing device 102 is inferred from the selected pairing-eligible device 104. For example, the pairing-eligible device user 122 associated with the selected pairing-eligible device 104 is determined to be the user 114 of the computing device 102.

According to examples, the authentication service 106 comprises an authentication engine 128 illustrative of a software module, system, or device operative to generate and issue a notification to the specified pairing-eligible device 104 in the form of a request message. In some examples, the notification is sent to the authentication client 116 executing on the pairing-eligible device 104, and displayed in a user interface to the pairing-eligible device user 122. In other examples, the notification is sent as an email message, a text message, a phone call, or other electronic message type to the pairing-eligible device 104. In some examples, the notification includes an authentication challenge. According to examples, the notification requires a response from the pairing-eligible device user 122 to authenticate the user 114.

In some examples, the response may be an indication that the pairing-eligible device user 122 agrees to validate the user's identity, for example, a selective indication of validation. As another example, the response may be an answer to a challenge. The authentication engine 128 is further operative to receive the response from the pairing-eligible device 104, and check the response. If the response is indicative of a verification, the authentication engine 128 is further operative to complete authentication for the user 114, and grant the user 114 access to resources for which the user 114 is authorized to access. For example, the authentication engine 128 creates and sends a signed token to the computing device 102 enabling the user 114 to access various applications 118, services, and resources.

Figure 2A:
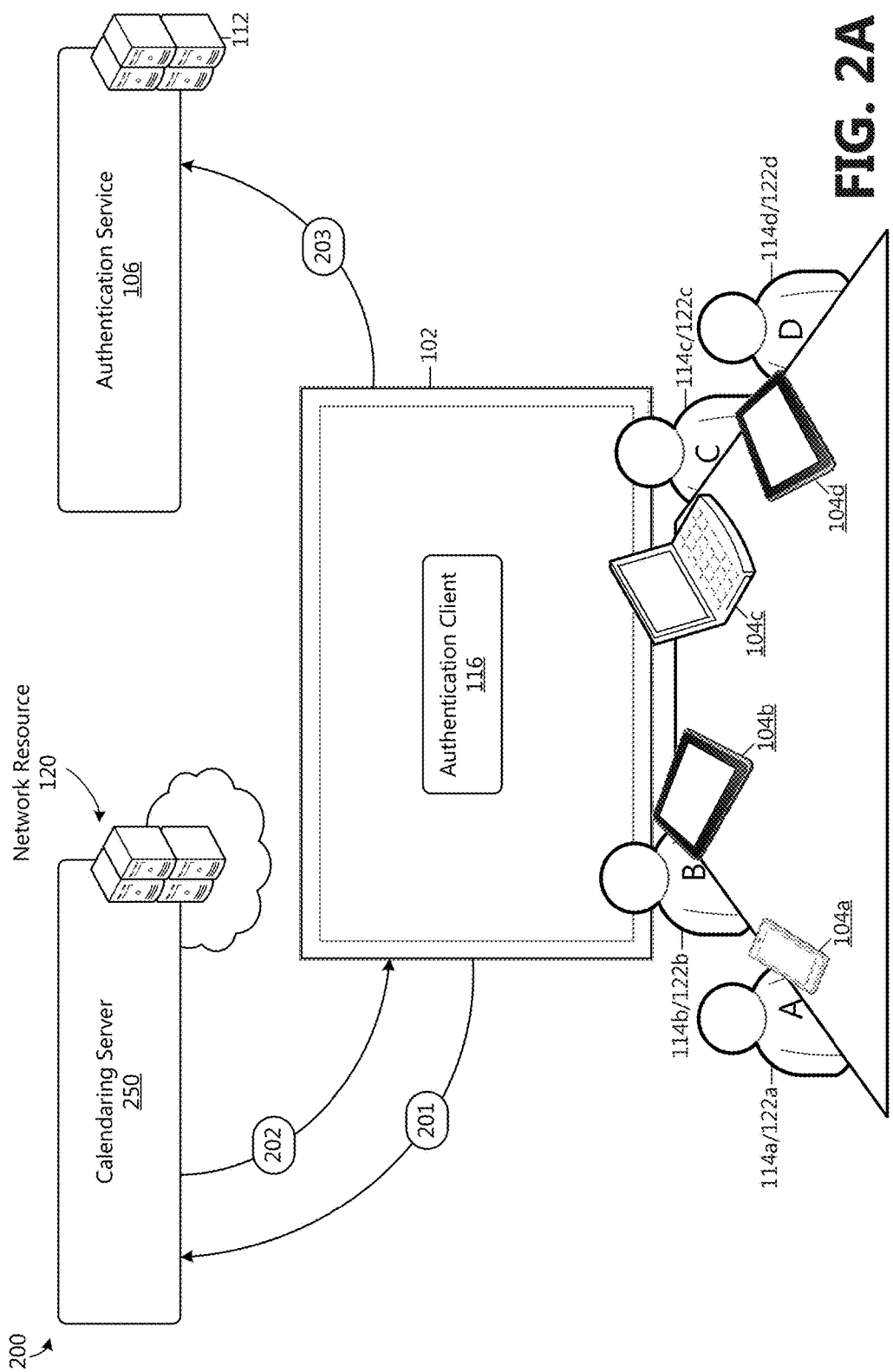

With reference now to FIGS. 2A-2E, data flow diagrams illustrating a flow of data through an example automated pairing-eligible device discovery authentication system 100. FIG. 2A is an illustration of an example automated pairing-eligible device discovery authentication system 200, wherein the network resource 120 is embodied as a calendaring server 250. For example, a plurality of users 114a-d may be attendees of a meeting, and a meeting room with a computing device 102, such as a large screen collaborative computing device, may be a resource associated with the meeting. One or more of the plurality of users 114a-d may wish to log into the computer device 102, for example, to access their files and the network 110. According to an aspect, the authentication client 116 executing on the computing device 102 sends an interrogation request 201 via an API call to the calendaring server 250 for identities of the meeting attendees (users A-D 114a-d). In response, the calendaring server 250 responds to the authentication client 116 executing on the computing device 102 with an encrypted token 202 comprising the identities of the meeting attendees (users A-D 114a-d). The authentication client 116 generates and sends a pairing device discovery request 203 comprising the encrypted token 202 to the authentication service 106.

Figure 2B:
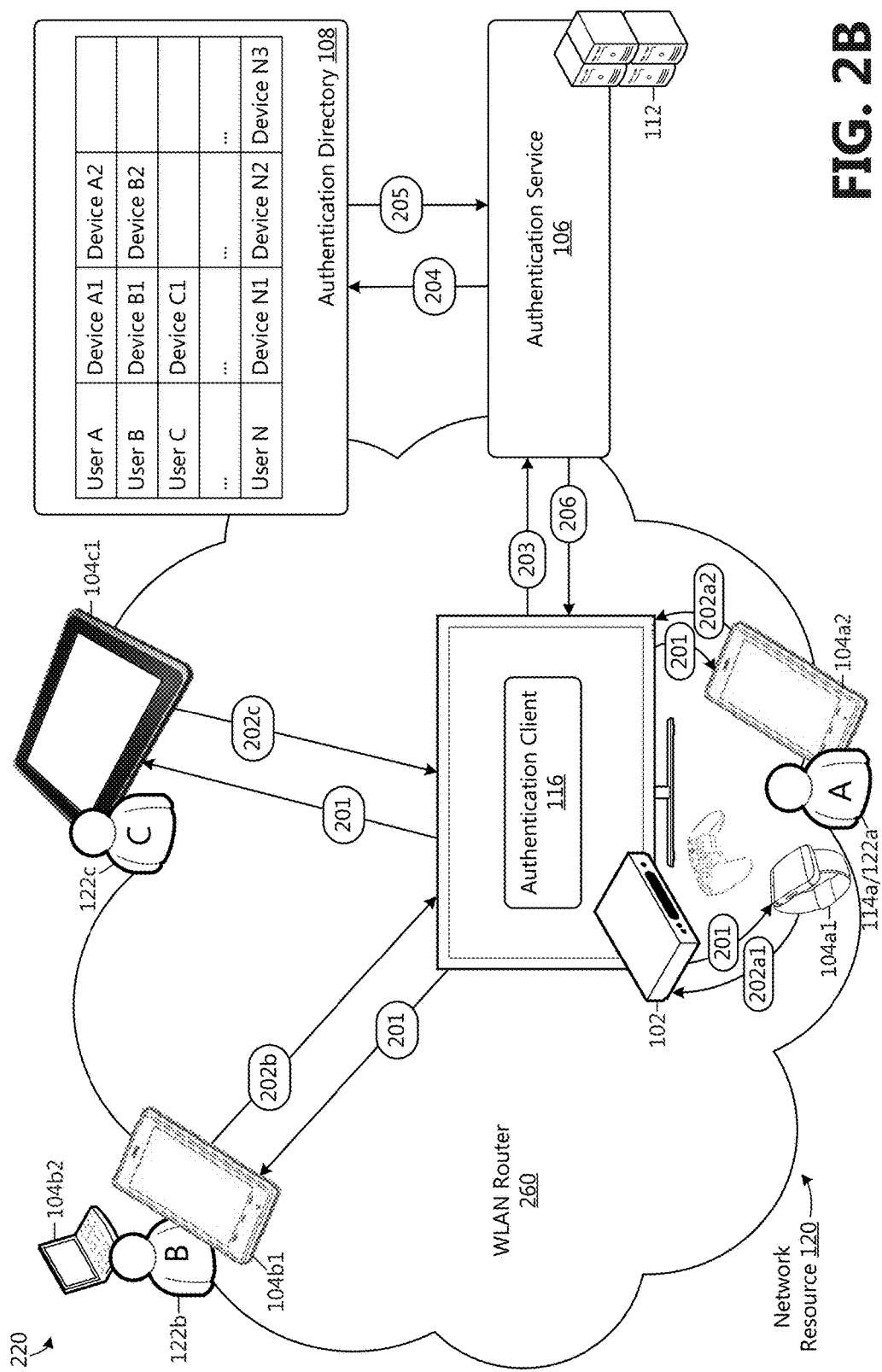
Figure 2C:
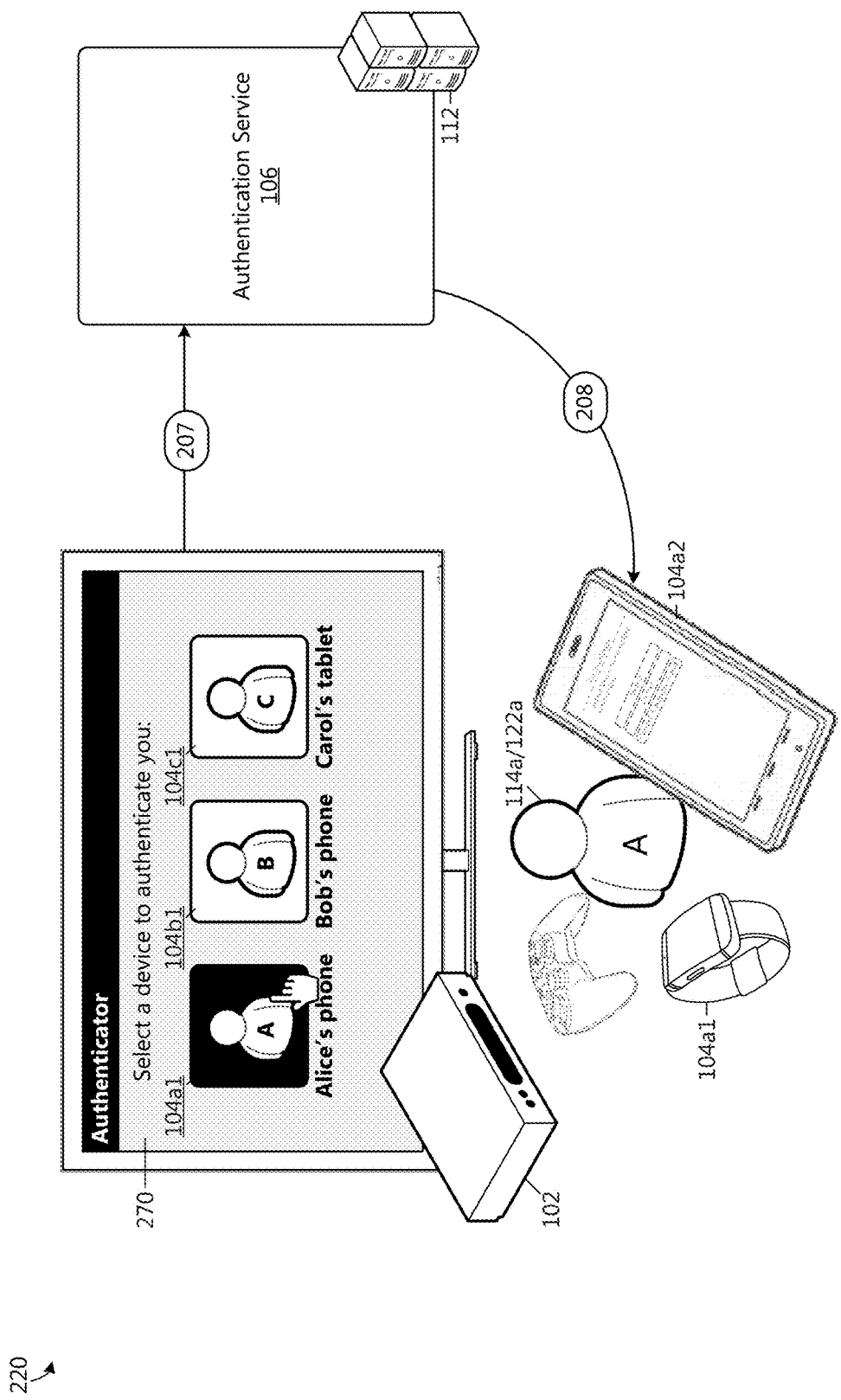

FIG. 2B is an illustration of an example automated pairing-eligible device discovery authentication system 220, wherein the network resource 120 is a router 260 associated with a WLAN. For example and as illustrated, a user (user A) 114a powers on a computing device 102, which in the illustrated example is a gaming device that has not yet been associated with user A 114a. According to aspects, the authentication client 116 executing on the computing device 102 sends an interrogation request 201 to the devices connected to the WLAN router 260. According to examples, the interrogation request 201 includes a request for at least one of: an identity of the device and an identity of the user of the device if the device is a pairing-eligible device 104.

As illustrated in FIG. 2B, user A 114a is a pairing-eligible device user 122a, and has two pairing-eligible devices 104a1 (a watch) and 104a2 (a mobile phone) that are connected to the WLAN router 260. Pairing-eligible device user B 122b has one pairing-eligible device 104b1 (a mobile phone) that is connected to the WLAN router 260, and one pairing-eligible device 104b2 that is not actively connected to the WLAN router 260; and pairing-eligible device user C 122c has one pairing-eligible device 104c1 (a tablet device) that is connected to the WLAN router 260. In response to the interrogation request 201: pairing-eligible device 104a1 sends an encrypted token 202a1 comprising at least one of: a unique identifier of the pairing eligible device 104a1 and a unique identifier of the pairing-eligible device user A 122a; pairing-eligible device 104a2 sends an encrypted token 202a2 comprising at least one of: a unique identifier of the pairing eligible device 104a2 and a unique identifier of the pairing-eligible device user A 122a; pairing-eligible device 104b1 sends an encrypted token 202b comprising at least one of: a unique identifier of the pairing eligible device 104b1 and a unique identifier of the pairing-eligible device user B 122b; and pairing-eligible device 104c1 sends an encrypted token 202c comprising at least one of: a unique identifier of the pairing eligible device 104c1 and a unique identifier of the pairing-eligible device user C 122c.

As illustrated, the authentication client 116 executing on the computing device 102 receives the encrypted tokens 202a1, 202a2, 202b, and 202c, generates a pairing device discovery request 203 comprising the received tokens, and sends the pairing device discovery request 203 to the authentication service 106 running on the authentication server 112. The authentication service 106 receives the pairing device discovery request 203, and decrypts the tokens 202a1, 202a2, 202b, 202c provided by one or more pairing-eligible devices 104 to retrieve identities of the pairing-eligible device users 122a, 122b, 122c.

The authentication service 106 sends a query request 204 to the authentication directory 108 to identify the pairing-eligible devices 104 associated with identified pairing-eligible device users 122a, 122b, 122c. The authentication directory 108 includes mappings between the pairing-eligible device users 122a, 122b, 122c and their pairing-eligible devices 104a1, 104a2, 104b1, 104b2, 104c1. In response to the query request 204, the authentication directory 108 returns a list 205 of pairing-eligible devices 104a1, 104a2, 104b1, 104b2, 104c1 to the authentication service 106.

In some examples, the authentication service 106 analyzes the list 205, and either removes pairing-eligible devices 104 from the list 205 that would not be preferable device types for providing a user interface for verifying an identity, or the authentication service 106 generates a list comprising default or preselected preferred pairing-eligible devices 104. The authentication service 106 sends the list 206 to the authentication client 116 executing on the computing device 102 for displaying to the user 114 via a user interface.

The authentication client 116 displays the list 206 of pairing-eligible devices 104 to the user 114. For example and with reference to FIG. 2C, pairing-eligible devices 104a1, 104b1, and 104c1 are uniquely represented and displayed on a display 270 associated with the computing device 102. The user 114a selects the pairing-eligible device 104a1 that he/she would like to utilize as a secondary device for verifying his/her identity. For example, the user 114a selects pairing-eligible device 104a2 from the list 206.

The authentication client 116 receives the user's selection, and sends a request message 207 including the user's selection to the authentication service 106. The authentication service 106 receives the request message 207, and generates and issues a notification 208 to the selected pairing-eligible device 104 specified in the request message 207. In the illustrated example, the authentication service 106 issues the notification 208 to pairing-eligible device 104a2. In some examples, the notification 208 includes an authentication challenge requiring a response from the pairing-eligible device user 122a to authenticate the user 114a.

With reference now to FIG. 2D, the authentication client 116 receives the notification 208, and presents the notification 208 and authentication challenge 280 to the pairing-eligible device user 122a. For example, the authentication challenge 280 may require an affirmative response to the notification 208 to verify the user 114, such as a selection or manipulation of a control displayed on a screen 290 associated with the pairing-eligible device 104a2, a reply to an electronic message, an audible response, a biometric response (e.g., heart rhythm, fingerprint, retina scan). The authentication client 116 sends the response 209 to the authentication service 106.

Figure 2E:
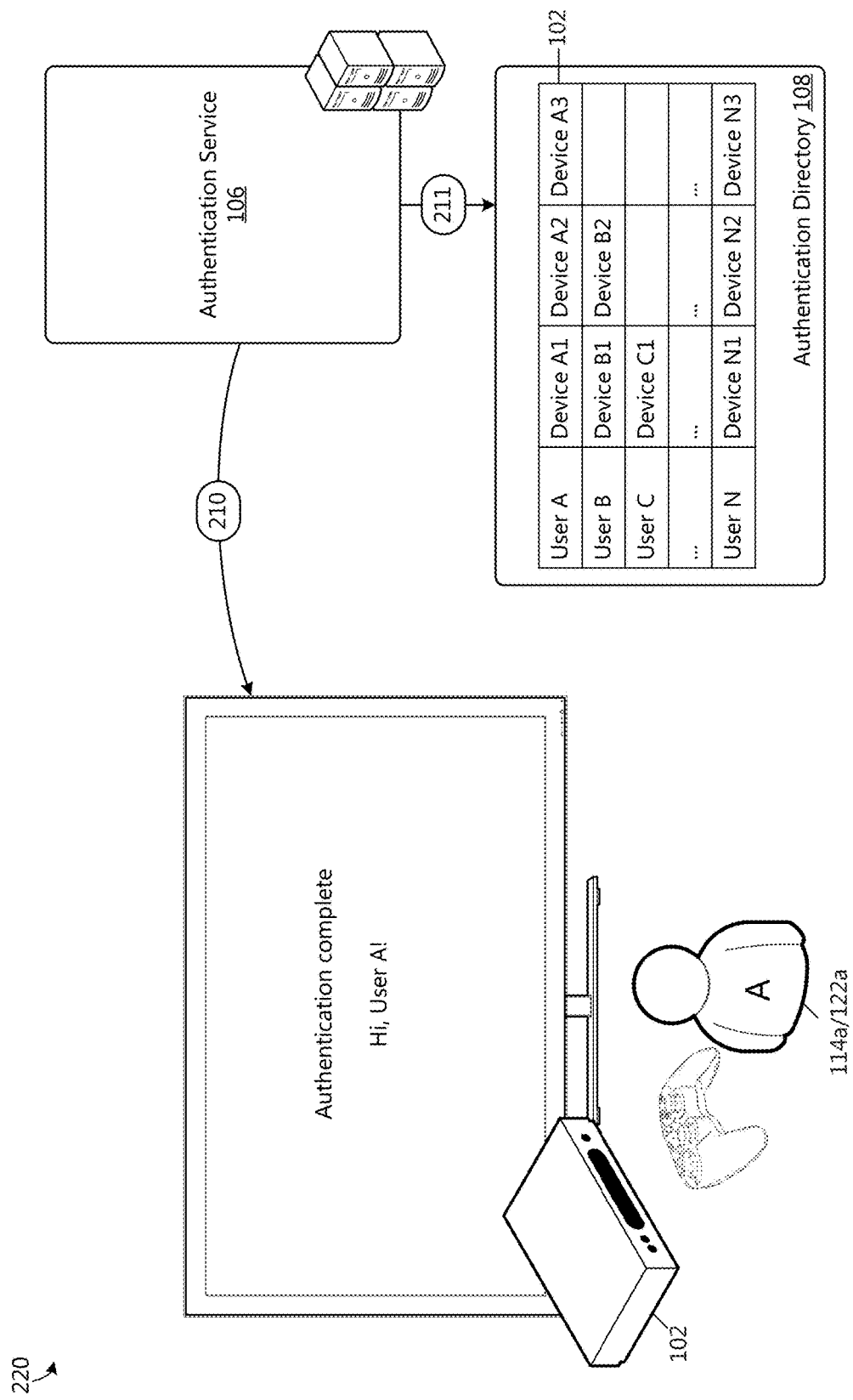

With reference now to FIG. 2E, the authentication service 106 receives and checks the response 209. If the response 209 matches an expected response, for example, a response indicative of a verification, the authentication engine 128 completes authentication for the user 114, and sends a signed token 210 to the computing device 102 enabling the user 114 to access various applications 118, services, and resources. Additionally, the authentication engine 128 sends a notification 211 to the authentication directory 108, notifying the authentication directory 108 to link the computing device 102 with the user 114, thus creating a strong bond between the computing device 102 and the pairing-eligible device 104a2.

Figure 3A:
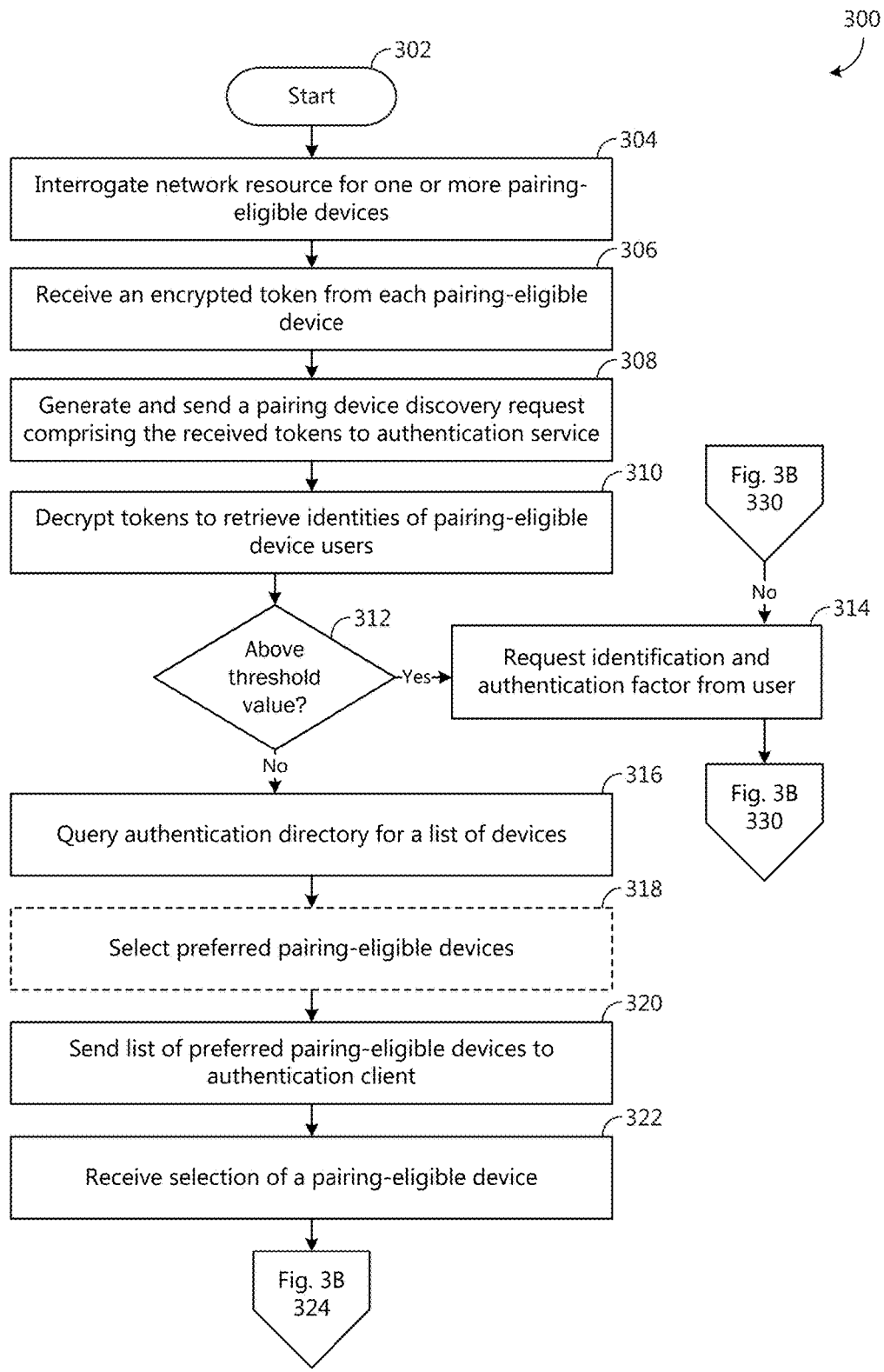
FIGS. 3A-3B is a flow chart showing general stages involved in an example method for automated device discovery of pairing-eligible devices for authenticating a user via a secondary device.

Having described an operating environment and flows of data with respect to FIGS. 1-2E, FIGS. 3A-3B is a flow chart showing general stages involved in an example method 300 for automated device discovery of pairing-eligible devices for authentication. With reference now to FIG. 3A, the method 300 begins at start OPERATION 302, where a user 114 initiates a login process on a computing device 102, wherein the computing device 102 does not know the identity of the user 114.

The method 300 proceeds to OPERATION 304, where the authentication client 116 executing on the computing device 102 sends an interrogation request 201 to a network resource 120 for identifying a pairing-eligible device 104 that can be utilized to verify the identity of the user 114. In some examples, the network resource 120 is a calendaring server 250. In other examples, the network resource 120 is a router associated with a subnetwork (e.g., WLAN router 260). According to examples, the interrogation request 201 is a request for at least one of: an identity of the device and an identity of the user of the device if the device is a pairing-eligible device 104.

The method 300 proceeds to OPERATION 306, where in response to the interrogation request 201, the network resource 120 (e.g., calendaring server 250) or each pairing-eligible device 104 connected to the network resource 120 (e.g., pairing-eligible devices 104 connected to the WLAN router 260) sends an encrypted token 202 including at least one of: the identity of the pairing-eligible device 104 and the identity of the pairing-eligible device user 122. The encrypted token 202 is received by the authentication client 116, and at OPERATION 308, the authentication client 116 generates a pairing device discovery request 203 comprising the received tokens 202, and sends the pairing device discovery request 203 to the authentication service 106 running on the authentication server 112.

At OPERATION 310, the authentication service 106 receives the pairing device discovery request 203, and the token decryptor 124 decrypts the tokens 202 provided by one or more pairing-eligible devices 104 to retrieve identities of the pairing-eligible device users 122.

The method 300 proceeds to a DECISION OPERATION 312, where a determination is made as to whether a number of identified pairing-eligible devices 104 exceeds a predetermined threshold value. For example, a determination is made as to whether the network resource 120 may not be a trusted subnetwork, such as one where the user 114 may not know or recognize the devices connected to it. If a determination is made that the number of identified pairing-eligible devices 104 exceeds the predetermined threshold value, the method 300 proceeds to OPERATION 314, where the authentication service 106 sends a request to the authentication client 116 for manual entry or selection of the user's identity and an authentication factor (e.g., entry of a username and password).

If a determination is made at DECISION OPERATION 312 that the number of identified pairing-eligible devices 104 does not exceed the predetermined threshold value, the method 300 proceeds to OPERATION 316, where the pairing-eligible device discovery engine 126 sends a query request 204 to the authentication directory 108 to identify the pairing-eligible devices 104 associated with identified pairing-eligible device users 122.

In some examples, the pairing-eligible device discovery engine 126 queries the authentication directory 108 for particular types of pairing-eligible devices 104 that would be a preferable secondary device for authenticating a user, for example, a device that the user 114 is likely to have with him/her and that would provide a user interface for allowing the user 114 to verify his/her identity (e.g., mobile phones, tablet devices, wearable devices). In other examples, the pairing-device user 122 is enabled to select a preferred pairing-eligible device 104, which is stored in the authentication directory 108.

Continuing with OPERATION 316, in response to the query request 204, the authentication directory 108 returns a list 205 of pairing-eligible devices to the pairing-eligible device discovery engine 126.

In some examples, the method 300 proceeds to OPERATION 318, where the pairing-eligible device discovery engine 126 selects particular types of pairing-eligible devices 104 from the list 205. For example, if the pairing-eligible device discovery engine 126 does not query the authentication directory 108 for particular types of pairing-eligible devices 104 at OPERATION 316, the pairing-eligible device discovery engine 126 may select the particular device types at OPERATION 318.

The method 300 proceeds to OPERATION 320, where the pairing-eligible device discovery engine 126 generates and sends a list 206 identifying pairing-eligible devices 104 to the authentication client 116 executing on the computing device 102 for displaying to the user 114 via a user interface.

At OPERATION 322, the authentication client 116 generates a user interface for displaying the list 206 of pairing-eligible devices 104 to the user 114, and receives an indication of a selection of a pairing-eligible device 104 by the user 114.

Figure 3B:
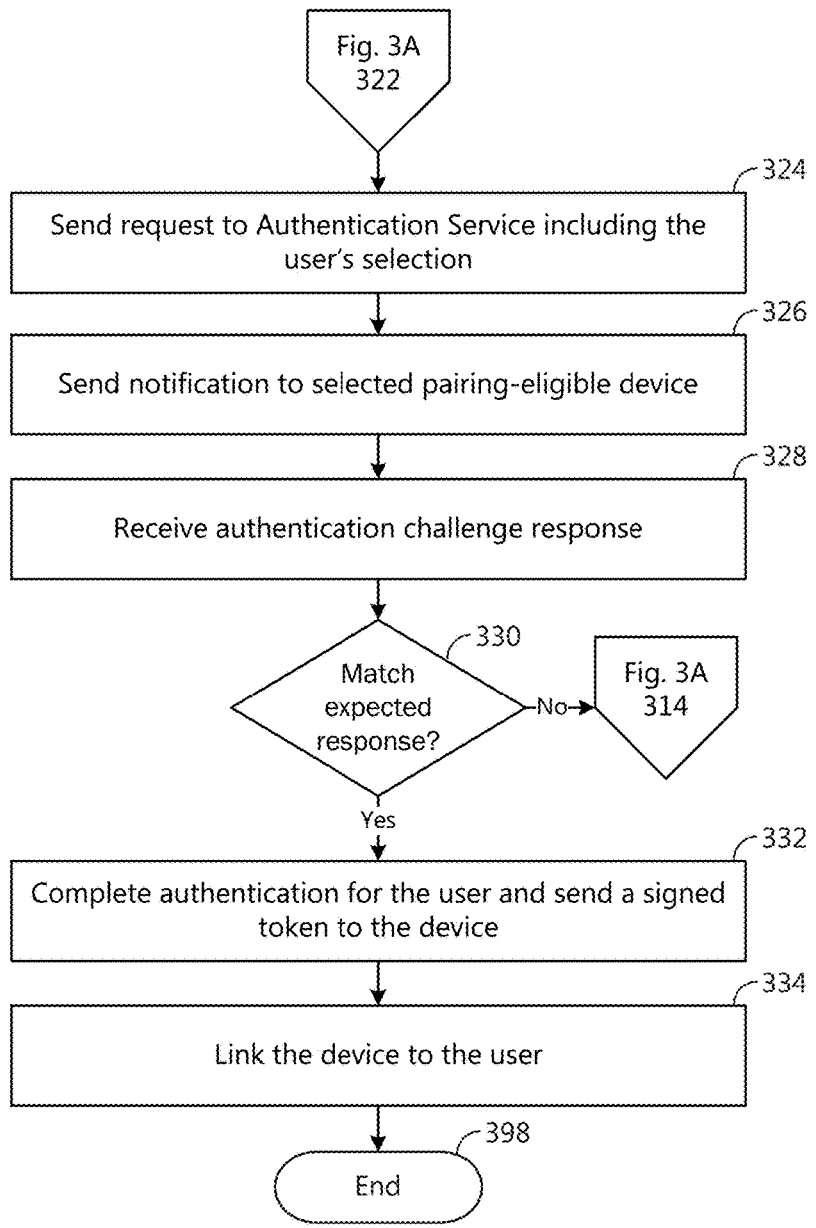

The method 300 proceeds to OPERATION 324 on FIG. 3B, where a request message 207 including the user's pairing-eligible device 104 selection is generated by the authentication client 116 and sent to the authentication service 106.

At OPERATION 326, the authentication engine 128 generates and issues a notification 208 to the selected pairing-eligible device 104 specified in the request message 207. In some examples, the notification 208 includes an authentication challenge requiring a response from the pairing-eligible device user 122 to authenticate the user 114. The authentication client 116 receives the notification 208, and presents the notification 208 and authentication challenge 280 to the pairing-eligible device user 122. In some examples, the authentication challenge is a request to the user 114 to provide an affirmative response to the notification 208, such as a selection or manipulation of a control displayed on a screen 290 associated with the pairing-eligible device 104. In other examples, the authentication challenge is a request for the user 114 to provide a biometric response (e.g., heart rhythm, fingerprint, retina scan). In other examples, the authentication challenge is a request for the user 114 to provide a knowledge factor (e.g., answer a question). In other examples, the authentication challenge is a request for the user 114 to send an electronic message response (e.g., text message, email message).

The method 300 proceeds to OPERATION 328, where the pairing-eligible device user 122 completes the authentication challenge, and the authentication client 116 sends a response 209 to the notification 208 to the authentication engine 128.

At DECISION OPERATION 330, the authentication engine 128 receives the authentication challenge response 209, and compares the response 209 to an expected response. If the authentication challenge response 209 does not match the expected response, the method 300 continues to OPERATION 314, where the authentication service 106 sends a request to the authentication client 116 for manual entry or selection of the user's identity and an authentication factor (e.g., entry of a username and password).

If a determination is made at DECISION OPERATION 330 that the authentication challenge response 209 matches the expected response, the method 300 proceeds to OPERATION 332, where the authentication engine 128 completes authentication for the user 114, and sends a signed token 210 to the computing device 102 enabling the user 114 to access various applications 118, services, and resources.

The method 300 continues to OPERATION 334, where the authentication engine 128 sends a notification 211 to the authentication directory 108, notifying the authentication directory 108 to link the computing device 102 with the user 114, thus creating a strong bond between the computing device 102 and the selected pairing-eligible device 104. The method 300 ends at OPERATION 398.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
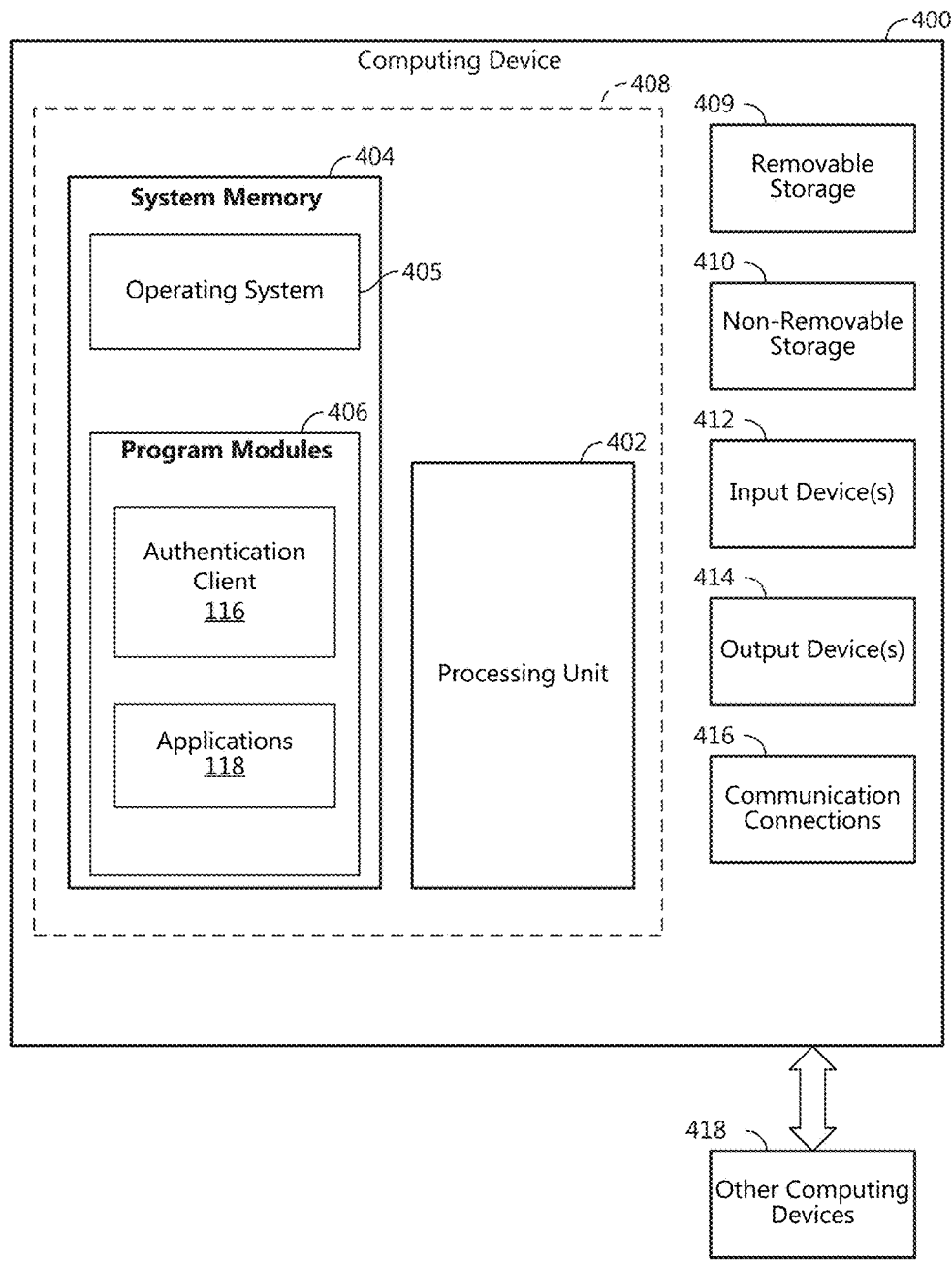
FIG. 4 is a block diagram illustrating example physical components of a computing device.
Figure 5A:
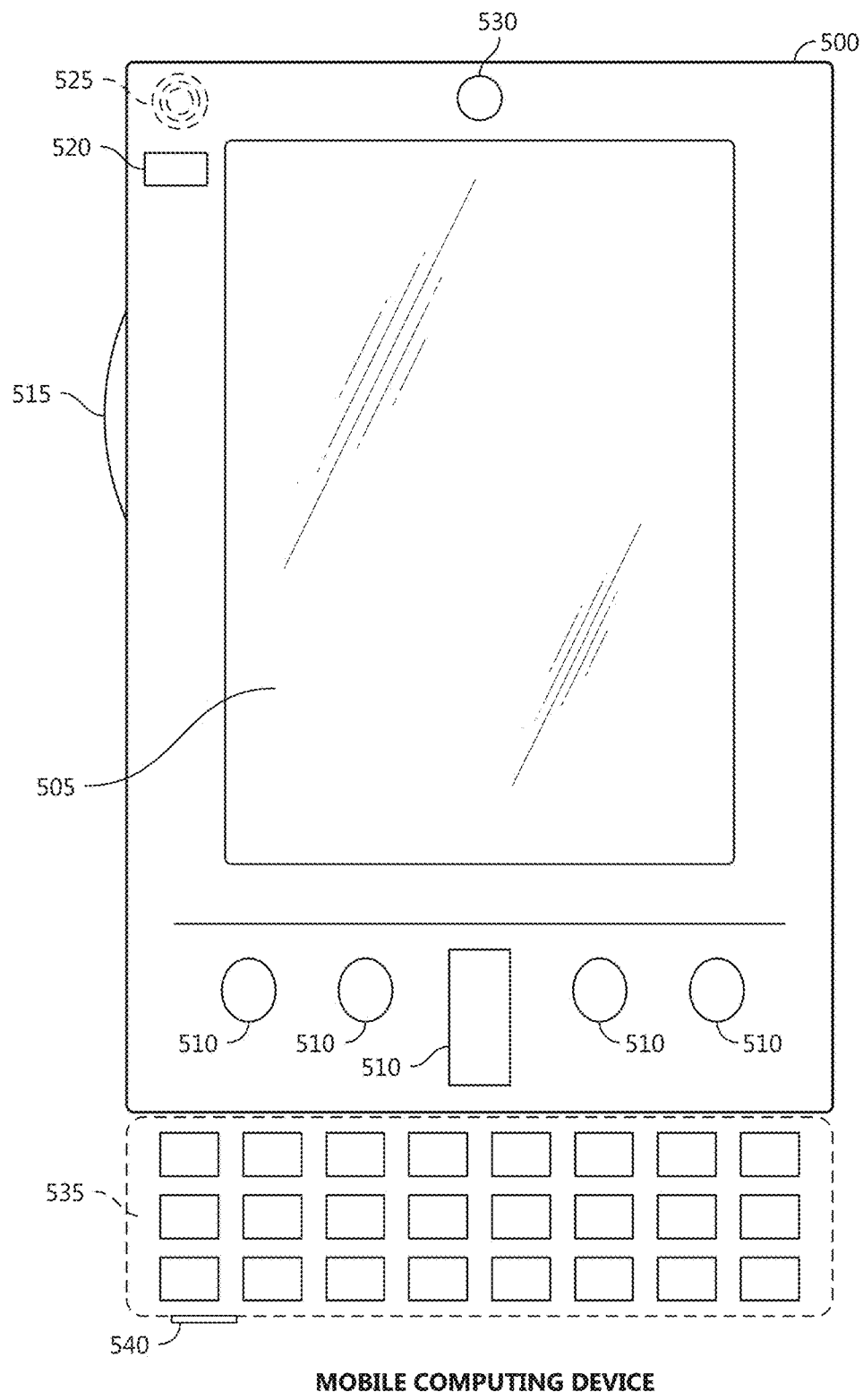
FIGS. 5A and 5B are simplified block diagrams of a mobile computing device.
Figure 5B:
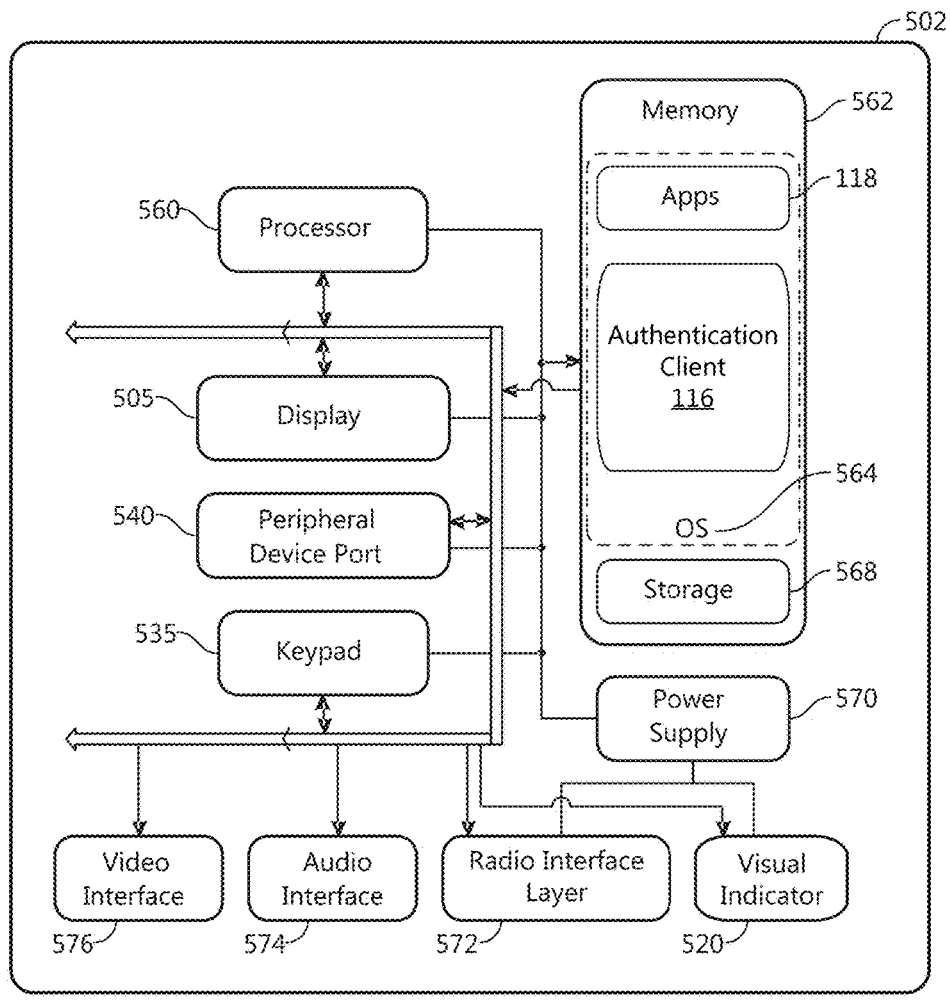
Figure 6:
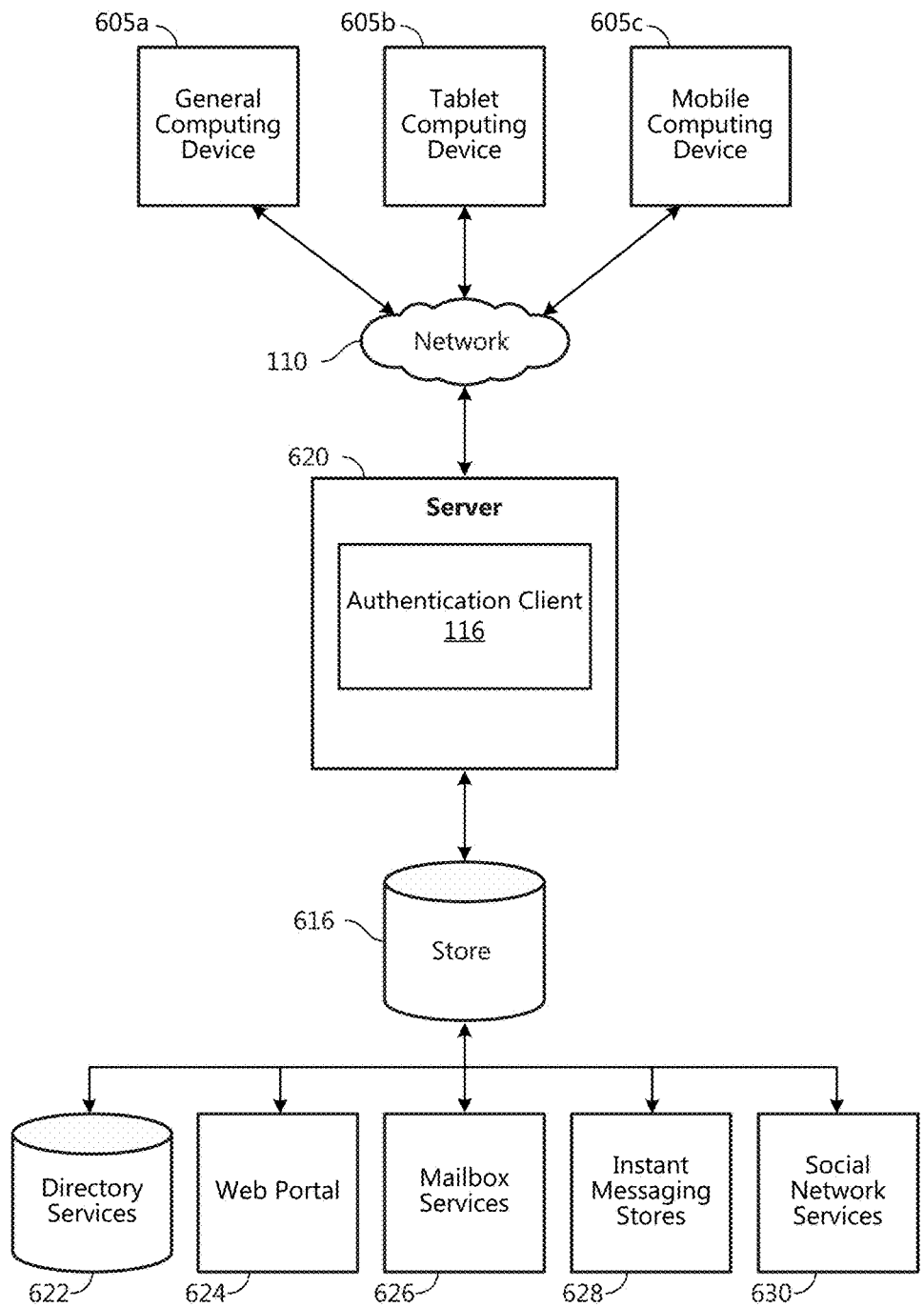
FIG. 6 is a simplified block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure are be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 118. According to an aspect, the system memory 404 includes the authentication client 116. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., authentication client 116) perform processes including, but not limited to, one or more of the stages of the method 300 illustrated in FIGS. 3A and 3B. According to an aspect, other program modules are used in accordance with examples and include applications such as electronic mail and contacts applications, word processing applications, spreadsheet applications, database applications, slide presentation applications, drawing or computer-aided application programs, and the like.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used.

According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 118 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the authentication client 116 is loaded into memory 562. The system 502 also includes a non-volatile storage area 568 within the memory 562. The non-volatile storage area 568 is used to store persistent information that should not be lost if the system 502 is powered down. The application programs 118 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 118 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

FIG. 6 illustrates one example of the architecture of a system for automated device discovery of pairing-eligible devices 104 for authentication as described above. Content developed, interacted with, or edited in association with the authentication client 116 is enabled to be stored in different communication channels or other storage types. For example, various documents may be stored using a directory service 622, a web portal 624, a mailbox service 626, an instant messaging store 628, or a social networking site 630. The authentication client 116 is operative to use any of these types of systems or the like for automated device discovery of pairing-eligible devices 104 for authentication, as described herein. According to an aspect, a server 620 provides the authentication client 116 to clients 605a,b,c. As one example, the server 620 is a web server providing the authentication client 116 over the web. The server 620 provides the authentication client 116 over the web to clients 605 through a network 110. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for discovering pairing-eligible devices for authenticating a user on a computing device, comprising:

via the computing device of the user, generating and sending an interrogation request to a network resource for identifying one or more pairing-eligible devices connected to the network resource or one or more pairing-eligible device users associated with an event stored on the network resource;

in response to the interrogation request, receiving at least one encrypted token, wherein the at least one encrypted token comprises a unique identifier associated with at least one pairing-eligible device of the one or more pairing-eligible devices connected to the network resource or a unique identifier associated with at least one pairing-eligible device user of the one or more pairing-eligible device users associated with the event stored on the network resource;

identifying one or more pairing-eligible devices associated with the at least one encrypted token by decrypting the at least one encrypted token and querying an authentication directory for a list of pairing eligible devices associated with the at least one pairing-eligible device user, wherein querying the authentication directory for the list of pairing-eligible devices associated with the at least one pairing-eligible device user comprises querying the authentication directory for predetermined device types; wherein the list of pairing eligible devices comprises at least one pairing eligible device having the predetermined device types;

generating the list of pairing-eligible devices associated with the at least one encrypted token;

displaying a user interface comprising the list of pairing-eligible devices;

receiving a selection of a pairing-eligible device from the list of pairing-eligible devices;

sending a notification to a selected pairing-eligible device, wherein the notification comprises an authentication challenge, receiving an authentication challenge response and making a determination as to whether the authentication challenge response matches an expected response; and in response to a positive determination as to whether the authentication challenge response matches the expected response, completing authentication for the user and sending a signed token to the computing device enabling the user access to authorized resources.

2. The computer-implemented method of claim 1, wherein generating and sending the interrogation request to the network resource comprises generating and sending the interrogation request to a router associated with a subnetwork to which the computing device is connected.

3. The computer-implemented method of claim 2, wherein identifying the one or more pairing-eligible devices connected to the network resource comprises identifying one or more computing devices connected to the router associated with the subnetwork.

4. The computer-implemented method of claim 1, wherein generating and sending the interrogation request to the network resource comprises generating and sending the interrogation request to a calendaring server.

5. The computer-implemented method of claim 4, wherein identifying the one or more pairing-eligible device users associated with the event stored on the network resource comprising identifying one or more invited attendees associated with a calendaring event stored on the calendaring server, wherein the computing device is a resource associated with the calendaring event.

6. The computer-implemented method of claim 1, wherein identifying the one or more pairing-eligible devices associated with the at least one encrypted token further comprises:
identifying the at least one pairing-eligible device user encoded in the at least one encrypted token.

7. The computer-implemented method of claim 6, wherein identifying the one or more pairing-eligible devices associated with the at least one encrypted token further comprises:
making a determination as to whether a number of pairing-eligible devices associated with the at least one encrypted token exceeds a predetermined threshold value; and
in response to a positive determination as to whether the number of pairing-eligible devices associated with the at least one encrypted token exceeds the predetermined threshold value, requesting an identity of the user.

8. The computer-implemented method of claim 1, further comprising pairing the selected pairing-eligible device with the computing device as a secondary device on which the user is enabled to verify an identity of the user.

9. A system for discovering pairing-eligible devices for authentication, comprising:
one or more hardware processors for executing programmed instructions;
memory, coupled to the one or more hardware processors, for storing program instruction steps for execution by the one or more hardware processors;
an authentication client, implemented by the one or more hardware processors operative to:
via a device of a user, generate and send an interrogation request to a network resource for identifying one or more pairing-eligible devices connected to the network resource or one or more pairing-eligible device users associated with an event stored on the network resource;

in response to the interrogation request, receive at least one encrypted token, wherein the at least one encrypted token comprises a unique identifier associated with at least one pairing-eligible device of the one or more pairing-eligible devices connected to the network resource or a unique identifier associated with at least one pairing-eligible device user of the one or more pairing-eligible device users associated with the event stored on the network resource; and an authentication service, implemented by the one or more hardware processors operative to:
identify the one or more pairing-eligible devices associated with the at least one encrypted token by decrypting the at least one encrypted token and querying an authentication directory for a list of pairing eligible devices associated with the at least one pairing-eligible device user, wherein querying the authentication directory for the list of pairing-eligible devices associated with the at least one pairing-eligible device user comprises querying the authentication directory for predetermined device types; wherein the list of pairing eligible devices comprises at least one pairing eligible device having the predetermined device types;

generate the list of pairing-eligible devices associated with the at least one encrypted token;

receive a selection of a pairing-eligible device from the list of pairing-eligible devices;

send a notification to a selected pairing-eligible device, wherein the notification comprises an authentication challenge, receiving an authentication challenge response and making a determination as to whether the authentication challenge response matches an expected response; and in response to a positive determination as to whether the authentication challenge response matches the expected response, complete authentication for the user and send a signed token to the computing device enabling the user access to authorized resources.

10. The system of claim 9, wherein in generating and sending the interrogation request to the network resource for identifying the one or more pairing-eligible devices connected to the network resource, the authentication client is operative to generate and send the interrogation request to a router associated with a subnetwork to which the computing device is connected for identifying one or more computing devices connected to the router associated with the subnetwork.

11. The system of claim 9, wherein in generating and sending the interrogation request to the network resource for the one or more pairing-eligible device users associated with the event stored on the network resource, the authentication client is operative to generate and send the interrogation request to a calendaring server for identifying one or more invited attendees associated with a calendaring event stored on the calendaring server, wherein the computing device is a resource associated with the calendaring event.

12. The system of claim 9, wherein in identifying the one or more pairing-eligible devices associated with the at least one encrypted token, the authentication service, implemented by the one or more hardware processors further comprises:
a token decryptor operative to:
identify the at least one pairing-eligible device user encoded in the at least one encrypted token.

13. The system of claim 9, wherein in identifying the one or more pairing-eligible devices associated with the at least one encrypted token, the authentication service implemented by the one or more hardware processors, further comprises a pairing-eligible device discovery engine is operative to:
- make a determination as to whether a number of pairing-eligible devices associated with the at least one encrypted token exceeds a predetermined threshold value; and
- in response to a positive determination as to whether the number of pairing-eligible devices associated with the at least one encrypted token exceeds the predetermined threshold value, request an identity of the user.

14. A device for discovering pairing-eligible devices for authentication, the device comprising one or more hardware processors, the device operative to:
- via a computing device of a user, generate and send an interrogation request to a network resource for identifying one or more pairing-eligible devices connected to the network resource or one or more pairing-eligible device users associated with an event stored on the network resource;
- in response to the interrogation request, receive at least one encrypted token, wherein the at least one encrypted token comprises a unique identifier associated with at least one pairing-eligible device of the one or more pairing-eligible devices connected to the network resource or a unique identifier associated with at least one pairing-eligible device user of the one or more pairing-eligible device users associated with the event stored on the network resource;
- identifying the one or more pairing-eligible devices associated with the at least one encrypted token by decrypting the at least one encrypted token and querying an authentication directory for a list of pairing eligible devices associated with the at least one pairing-eligible device user, wherein querying the authentication directory for the list of pairing-eligible devices associated with the at least one pairing-eligible device user comprises querying the authentication directory for predetermined device types; wherein the list of pairing eligible devices comprises at least one pairing eligible device having predetermined device types;
- display a user interface comprising the list of pairing-eligible devices; and
- receive a selection of a pairing-eligible device from the list of pairing-eligible devices;
- send a notification to a selected pairing-eligible device, wherein the notification comprises an authentication challenge, receiving an authentication challenge response and making a determination as to whether the authentication challenge response matches an expected response; and
- in response to a positive determination as to whether the authentication challenge response matches the expected response, complete authentication for the user and send a signed token to the computing device enabling the user access to authorized resources.

\* \* \* \* \*